United States Patent [19]

Schnittger

[11] 4,154,461
[45] May 15, 1979

[54] AUTOMOBILE SUSPENSION SYSTEM

[76] Inventor: Jan R. Schnittger, Trollvägen 29, 13300 Saltsjöbaden, Sweden

[21] Appl. No.: 867,200

[22] Filed: Jan. 5, 1978

[51] Int. Cl.² .......................................... B60G 17/04
[52] U.S. Cl. .................................. 280/710; 267/8 R; 267/64 B; 280/714
[58] Field of Search .............. 280/689, 690, 697, 710, 280/707, 702, 703, 704, 714, 112 A, 112 R; 267/8 R, 8 A, 64 A, 64 B

[56] References Cited

U.S. PATENT DOCUMENTS

| | | | |
|---|---|---|---|
| 2,861,795 | 11/1958 | Blake | 267/8 R |
| 2,917,303 | 12/1959 | Vierling | 267/8 R |
| 3,030,100 | 4/1962 | Wagner | 267/8 R |
| 3,032,349 | 5/1962 | Fiala | 280/702 |
| 3,178,167 | 4/1965 | Menar | 280/710 |
| 3,991,863 | 11/1976 | Lee | 267/64 B |
| 3,995,883 | 12/1976 | Glaze | 280/707 |

Primary Examiner—Robert R. Song
Attorney, Agent, or Firm—Limbach, Limbach & Sutton

[57] ABSTRACT

A suspension system for a vehicle having frame, a wheel and a movable support for said wheel is disclosed. The suspension system comprises a first shock absorbing member functionally connected to the wheel support. The first shock absorbing member is connected in parallel to a first spring means which is also connected to the wheel support. The first spring means and first shock absorbing member are connected in series to a second shock absorbing member which in turn is functionally connected to the vehicle frame. A second spring means, preferably having a lower spring stiffness than said first spring means, is employed in a parallel configuration with said second shock absorbing member and can either be in parallel with said first shock absorbing member and first spring means or in series with these latter elements.

The first shock absorbing member further contains upper and lower fluid chambers separated by a piston for further control. As a preferred embodiment, the second shock absorbing member also contains upper and lower fluid chambers for altitude control.

13 Claims, 6 Drawing Figures

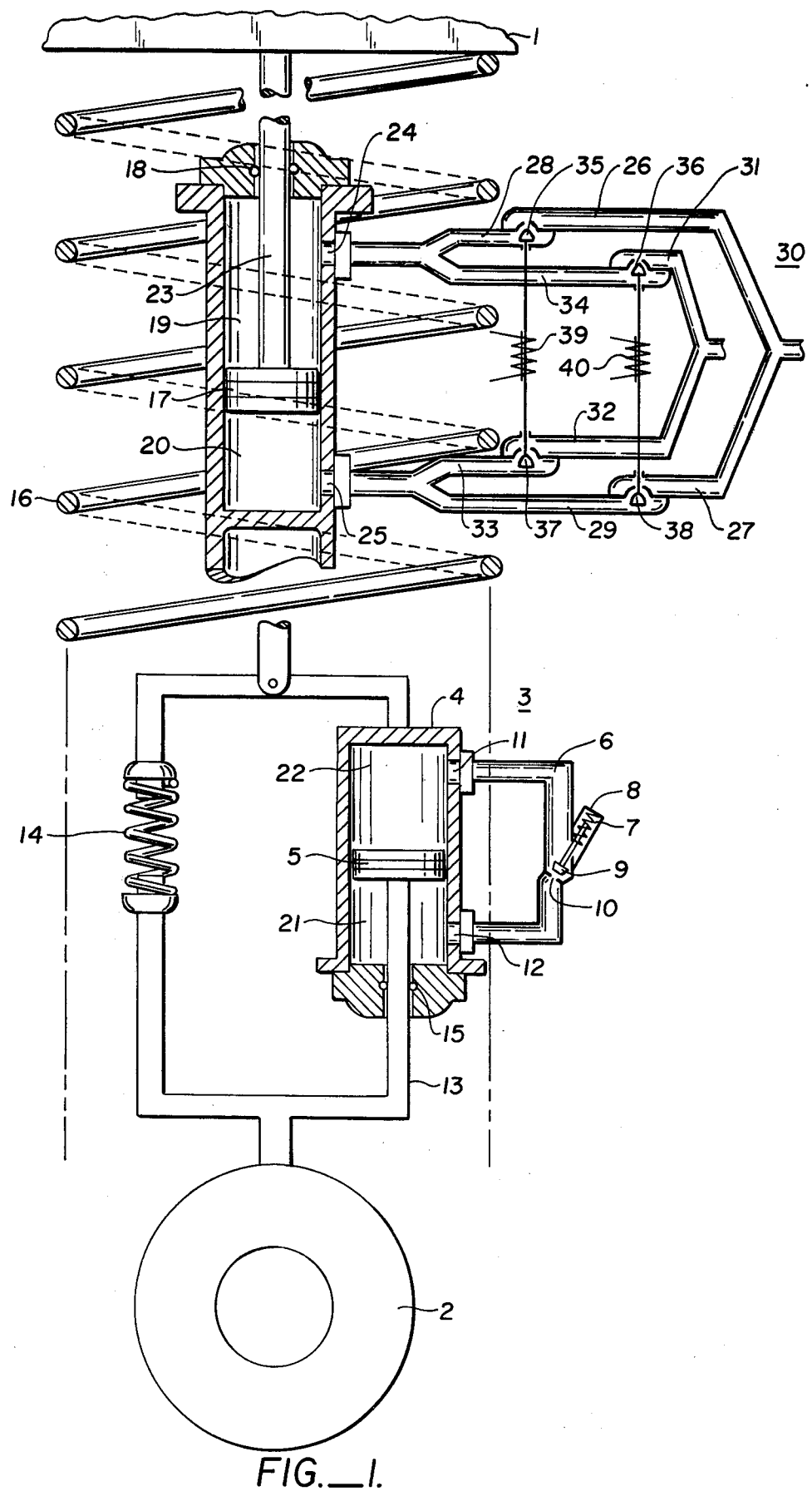
FIG._1.

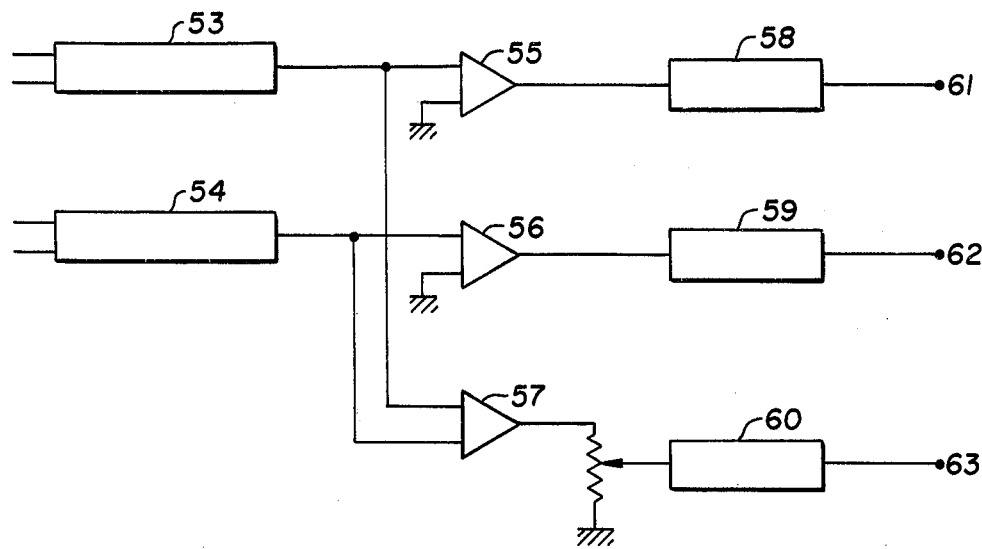
FIG._3.
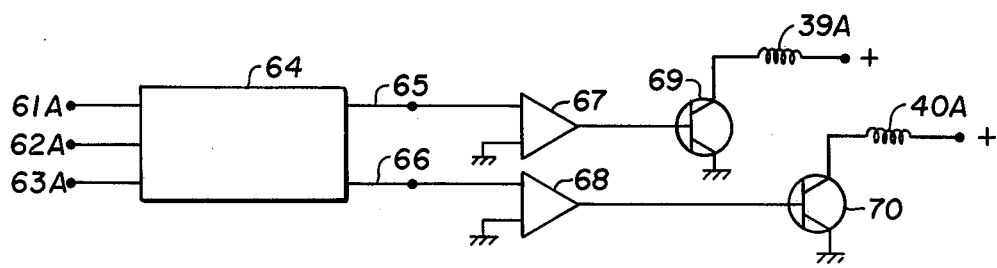
FIG._4.
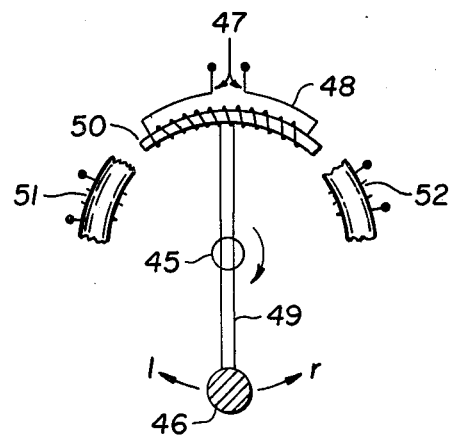
FIG._2.

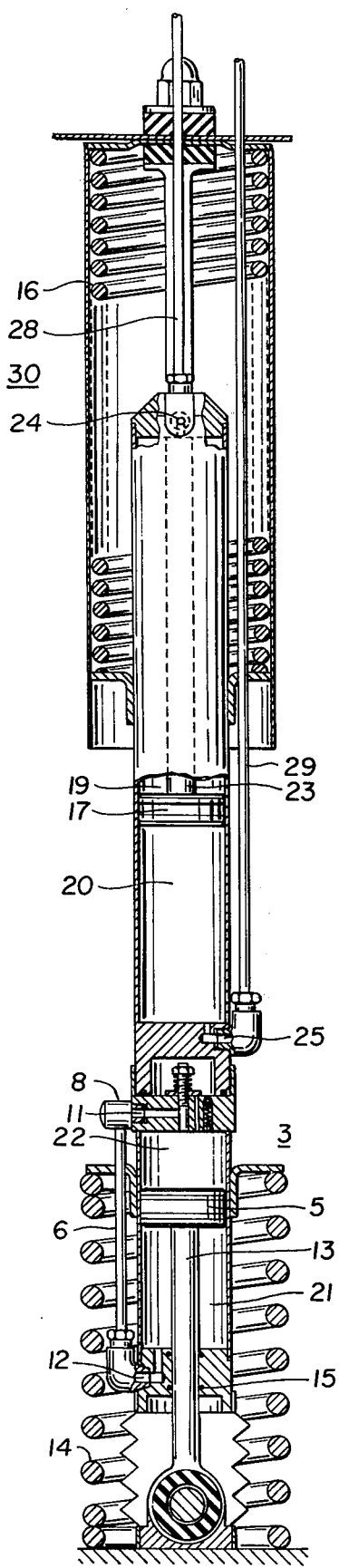
FIG._5.
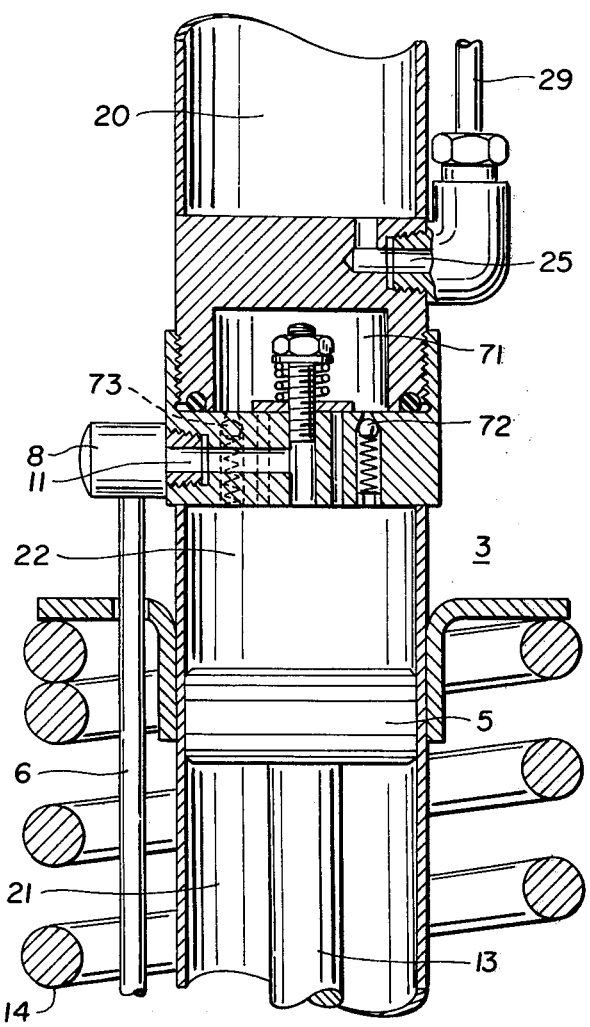
FIG._6.

AUTOMOBILE SUSPENSION SYSTEM

BACKGROUND OF THE INVENTION

The term "shock absorber" is somewhat less than accurate. It is a spring which absorbs shock by distributing the force over a long time period and distance. The "Shock absorber's" principal function is to damp the suspension movement, both on upward bounce and resulting rebound. It does so by converting the kinetic energy of suspension movement to thermal energy; the heat so generated is dissipated to the atmosphere or the car's chassis. Shock absorber design is intimately connected to that of the suspension system in toto, tires, springs, chassis, and their linking components.

The passive shock absorber system which dissipates or damps the relative movement between the tire or unsprung mass and the chassis or sprung mass is a passive system which, to date, was adequate as a motor vehicle suspension component. Automobile manufacturers relied upon the great mass of present day automobiles to aid in the damping function of the passive suspension system. With the advent of the "energy crisis", the tendency is to drastically reduce the mass of future automobiles to a point where they will weigh less than half the weight of current day versions. Unless automobile suspension systems can be drastically redesigned and modified, the smooth riding characteristics traditionally associated with today's heavy automobiles could no longer be realized.

Design of a shock absorber must take into account the many variations of road surface, vehicle speed and vehicle load. One has only to follow an empty flatbed trailer to appreciate the contribution of these variables to axle hop and control. Since the shock absorber has no support function in the suspension, its design does not affect steady state conditions per se. Even here, though, the transients leading to these conditions—body roll, understeer and oversteer—can be affected by shock absorber specification.

The classical system employed in most automotive vehicles today is a passive system in which a spring and a shock absorber are arranged in parallel between the sprung and unsprung masses. At high frequencies of disturbance or at the arrival of a bump in the course of travel, the shock absorber acts as a stiff member. Hence, sudden acceleration of the unsprung mass or wheel hits the passenger compartment almost unmitigated. Theoretically, an improved system would consist of placing a shock absorber and spring in series for a high frequency disturbance would be absorbed by the spring independent of the stiffness of the shock absorber. However, a shock absorber cannot sustain any static load unless a second spring is placed in parallel with it to act as a lever.

Accordingly, it is an object of the present invention to provide an automobile suspension system which eliminates the disadvantages outlined above.

Another object of the present invention is to provide a vehicle suspension system wherein several springs and shock absorber members are configured to greatly improve the suspension qualities of the system.

Yet another object of the present invention is to provide a vehicle suspension system wherein a relatively low mass vehicle can be caused to exhibit a feel and ride comparable to a vehicle of much heavier mass.

Still another object of the present invention is to provide a vehicle suspension system which at least partially compensates for centrifugal force while the vehicle is cornering a horizontal corner and can be used to at least partially compensate for an incline as an aid in maintaining the vehicle in a horizontal plane.

A further object of the present invention is to provide a vehicle suspension system which acts to greatly reduce the characteristic motion of a vehicle when exposed to a sudden breaking action.

Quite generally, the suspension system of the present invention is used in an automobile or other type of vehicle having a frame, a wheel and movable support for said wheel. The suspension system is comprised of four basic elements:

1. A first shock absorbing member functionally connected to the wheel support having upper and lower fluid-containing chambers separated by a piston and possessing control means capable of connecting and partially disconnecting the fluid chambers.
2. A first spring means arranged in parallel with the first shock absorbing member and functionally connected to the wheel support.
3. A second shock absorbing member functionally connected to the vehicle frame and arranged in series with the first shock absorbing member and the first spring means.
4. A second spring means arranged in parallel with the second shock absorber member and in one embodiment in series with the first shock absorbing member and first spring means and in parallel with these elements in a second embodiment.

In order to provide for increased comfort, the first spring means is designed to have a greater spring stiffness than the second spring means; optimally, the second spring means should possess a spring stiffness of only approximately 20% of the spring stiffness of the first spring means.

Using various controls, which will be explained later, the suspension system is designed so that whenever the first shock absorbing member and first spring means are expanding the control means causes the fluid chambers within the first shock absorbing member to at least partially disconnect whenever the vehicle frame is vertically rising and to connect the various fluid chambers whenever the vehicle frame is vertically falling.

Conversely, the suspension system of the present invention is defined so that whenever the first shock absorbing member and first spring means are being compressed, the control means is caused to at least partially disconnect the fluid chambers from one another whenever the vehicle frame is vertically falling and to connect the fluid chambers whenever the vehicle frame is vertically rising.

The present invention can be more readily appreciated by viewing the following drawings wherein:

FIG. 1 is a partial cross-sectional view of the shock absorbing system of the present invention.

FIG. 2 represents a schematic of a device for feeding information to the logic circuit shown in FIGS. 3 and 4.

FIGS. 3 and 4 represent a configuration for the control circuit of the second shock absorber.

FIG. 5 shows a partial cross sectional view of a preferred embodiment of the present invention.

FIG. 6 shows an enlarged sectional view showing the solenoid control and piston reservoir of FIG. 5.

Turning to FIG. 1 in more detail, the vehicle or sprung mass 1 is isolated from wheel or unsprung mass 2 via the shock absorber system shown. First shock absorber member 3 is made up of shock absorber housing 4 containing piston 5 which separates chambers 21 and 22 within housing 4. These chambers contain fluid as suggested in the prior art such as oil, water, alcohol, etc. For a list of such materials, see U.S. Pat. No. 3,731,914 issued on May 8, 1973. The fluid, once packed, is unable to leak from the housing 4 because of the placement of seals 15 about shaft 13.

Placed in a parallel configuration with shock absorber 3 is first spring means 14. Coil spring 14 is passive and expands or contracts together with piston 5 by being acted upon by vibrations from wheel 2 and sprung mass 1.

As stated previously, the shock absorber system of the present invention provides for a greatly improved suspension system primarily due to control of the shock absorbing members. In furtherance of this goal, control means are placed upon first shock absorbing member 3 which allow for the passage of fluid between chambers 21 and 22 in a controlled fashion. In other words, when desired, plunger 9 can be withdrawn from opening 10 allowing the passage of fluid between chambers 21 and 22 and, similarly, plunger 9 can close in upon passage 10 thus partially blocking the passage of fluid between the two chambers.

It has been found that whenever the first shock absorbing member 3 and first coil spring means 14 are expanding, plunger 9 is caused to close, which causes a partial blocking of opening 10. This partially restricts the flow between the fluid chambers whenever the vehicle frame is vertically rising. Conversely, plunger 9 is withdrawn from opening 10, thus lessening any restriction between the fluid chambers, whenever the vehicle frame is vertically falling.

Whenever the first shock absorbing member 3 and first spring means 14 are being compressed, plunger 9 is caused to close in upon passage 10 thus partially restricting the flow between fluid chambers 21 and 22 whenever the vehicle frame is vertically falling and the control means is caused to connect the fluid chambers whenever the vehicle frame is vertically rising.

When the chambers 21 and 22 are partially closed off from one another by partially restricting fluid from passing through channel 6 due to valve 9 and passage 10, the first shock absorber resists motion of the wheel being transmitted to the vehicle frame by reducing the velocity of piston 5 with respect to the velocity of housing 4. In this mode, coil spring 14 is substantially prevented from expanding or contracting because it is in parallel with first shock absorber means 3. In this mode, the movement of the vehicle is highly restricted and any movement taken by the sprung mass 1 is countered with a relatively high degree of force. Applying this to a situation, for example, when the vehicle or sprung mass is rising and the first shock absorber member 3 and first sprung means are expanding, the valve is partially closed which will inhibit the rising motion of the vehicle. If the vehicle is vertially falling but the first shock absorber means and first spring means are expanding, then fluid is allowed to freely pass between chambers 21 and 22 via openings 11 and 12 which substantially reduces any damping action of the shock absorber thus smoothing out the downward motion of the vehicle and causing the vehicle to experience a smooth, comfortable ride.

Second shock absorber member 30 is employed in the present invention for altitude control, which will be explained at a later point in this application. Shock absorbers are unable to support a static load. Therefore, second spring means 16 is employed parallel to second shock absorber member 30. Second coil spring means 16 also performs a smoothing function in the shock absorber assembly and should have a stiffness considerably less than the first coil spring means 14. It has been found that second coil spring means preferably should have a stiffness of only approximately 20% of the stiffness of the first spring means.

As in the lower shock absorber 3, upper shock absorber 30 contains two fluid chambers 19, 20 separated by piston 17. Fluid is unable to escape from chamber 19 because of seals 18 surrounding shaft 23 which is directly coupled to vehicle or sprung mass 1. Unlike the first shock absorber 3 which has a control system for merely connecting chambers 21 and 22 for fluid passage, second shock absorber 30 contains an active system for supplying the same type of fluids to chamber 20 and chamber 19 via openings 24 and 25 through the various valves 35, 36, 37 and 38. The functioning of the valves and pumping system and the logic employed in determining when the fluids are to be pumped within chambers 19 and 20 will be discussed later. However, it should be noted at this time that the function of second shock absorber means 30 is to level out a vehicle during conditions which would cause the vehicle to assume a non-level position. For example, an automobile possessing the shock absorbing system of the present invention may be positioned on a hill wherein the front portion of the vehicle is facing up the hill and is higher than the rear portion of the vehicle. Upon proper actuation, high pressure fluids can be pumped into chamber 20 causing piston arm 23 to rise while pumping fluid out of chamber 19. This could be done simultaneously on the suspension systems associated with each rear wheel thus causing the vehicle to assume a more horizontal configuration.

A second area where the second shock absorber 30 can be utilized is when a vehicle, such as an automobile, is caused to proceed about a horizontal corner at high speed. Anyone performing such an act would readily recognize that the automobile is caused to sway wherein the suspension system associated with the outermost tires compresses more than the suspension system associated with the tires on the innerpart of the curve. This phenomenon causes the passengers of the vehicle to abnormally lean and experience discomfort and, in extreme situations, may cause a loss of control of the vehicle. Such a situation has been improved in high performance sports cars by employing extremely stiff and uncomfortable suspension systems therein. However, the shock absorbing system of the present invention can be much smoother and isolate the sprung mass 1 from road vibration and yet perform admirably on horizontal cornering situations by causing expansion of second shock absorbing means 30 in the suspension systems associated with the outermost wheels by pumping fluid into chamber 20 via port or orifice 25 and removing fluid from chamber 19 via port or orifice 24. This will give the sensation of a banked curve adding to greater control and comfort during high speed cornering.

Turning now to control of valve 9 which, as stated previously, controls the passage of fluid between chambers 21 and 22 in first shock absorbing member 3, it must be emphasized that the present invention does not reside in a specific control means. A control means will be discussed in order to enable one of ordinary skill to practice the invention. However, any control means can be used for this valving system while remaining within the spirit and scope of the present invention.

By noting what has been said with regard to the functioning of the valve structure 8 comprising plunger 9 and orifice 10, a control system must be employed which can determine the expansion and contraction of first shock absorbing means 3 and also determine whether or not the sprung mass 1 is rising or falling. In order to determine whether first shock absorbing means 3 is expanding or contracting one could, for example, fabricate a non-magnetic cylinder containing a magnetic plate and arm parallel to the first shock absorbing means 3. As the first shock absorbing means expands, so would its parallel member inducing a magnetic field within a coil surrounding the non-magnetic cylinder. As the first shock absorbing means expands, a magnetic field of one polarity would be produced while contraction would produce an opposite polarity. In order to determine whether or not sprung mass 1 is vertically rising or vertically dropping, an accelerometer can be used wherein a coil surrounds a magnet on a spring attached to a point on sprung mass 1. As the vehicle rises, the spring compresses causing the magnet to drop within the coil and causing a current of predetermined polarity. Similarly, as the sprung mass vertically drops, the magnetic weight rises within the coil causing a magnetic field of opposite polarity. These signals can be fed to a computer integrator in order to determine the sign of the following equation:

$$S = \dot{Z}(\dot{Y} - \dot{X})$$

wherein $\dot{Z}$ equals the velocity of the sprung mass 1
$\dot{Y}$ equals the velocity of first piston housing 4
$\dot{X}$ equals the velocity of unsprung mass 2.

When $\dot{Y} - \dot{X}$ is positive, first shock absorber means 3 is expanding while a negative value of $\dot{Y} - \dot{X}$ indicates that the shock absorber means is contracting. Thus, when the value of $\dot{Z}(\dot{Y}-\dot{X})$ is equal to or greater than zero, valve 8 is partially closed, while when it is less than zero, the valve is open allowing fluid flow between chambers 21 and 22.

The values of $\dot{Z}$, $\dot{X}$ and $\dot{Y}$ are determined by, for example, the flow of current through the various coils as outlined above. This current is fed into a computer integrator which converts the current flow into a specific sign. One input could be the value of $\dot{Z}$ while the other input is the value of $(\dot{Y}-\dot{X})$. The computer integrator then feeds these signals to a computer which multiplies $\dot{Z}$ times $(\dot{Y}-\dot{X})$ to produce a value S and then senses the sign of this value and feeds this sign to a microprocessor. The "sign bit" in the processor could be accessed which could then control solenoid 7 which opens and closes passage 10 via plunger 9.

Control over fluid flow within second shock absorber 30 is accomplished by pumping high pressure fluid within chambers 19 and 20 upon command. Solenoids 39 and 40 act to control plungers 35, 36, 37 and 28 to open and close passages to orifices 24 and 25. High pressure fluid enters the system through passages 26 and 27. This fluid is dumped from the system via passages 32 and 34. Thus, it can be seen that when solenoid 39 is activated such that plug ends 35, 37 are pushed in a downwardly direction, high pressure energy is able to be pumped through orifice 24 into chamber 19 while fluid in chamber 20 can be dumped through orifice 25 out legs 33 and 32. When it is desired to pump high pressure fluid within chamber 20, solenoid 40 is activated so that the arm supporting plugs 36, 38 moves in a downwardly direction allowing fluid to pass from the high energy source through legs 27 and 29 through orifice 25 while fluid contained in chamber 19 can pass through orifice 24 through leg 34 and out via leg 31. At this point, control over solenoids 39 and 40 will be discussed.

Referring to FIG. 2, pendulum 49 supporting weight 46 is caused to pivot about point 45. Pendulum 49 should be damped to prevent its movement during slight vibrational activity of the vehicle. The amount of damping is a design parameter the value of which would directly affect the sensitivity of the system. This pivot point is attached to the car chassis so that a change in attitude of the chassis will be reflected in movement of the pendulum about its pin support 45. While the chassis is horizontal and not being acted upon by any external forces, armature 50 is completely external sensor coils 51, 52. Because armature 50 is permanently magnetized by AC coil 47, a current is induced at coils 51, 52 whenever armature 50 passes within the coils. The current, in AC form, passes through demodulators 53, 54 (FIG. 3) and are converted to a DC voltage. This voltage passes to gain circuits 55 and 56 and common gain rejection mode amp limiter 57. The amplified current then passes through triggers 58, 59 and 60 producing values 61, 62 and 63. The absolute values of each current can be read at 61 and 62 while the sign at 63 determines whether the current at 61 is at a higher level than that at 62 or vice versa. These three values are fed into computer 64 at 61A, 62A and 63A (FIG. 4). Computer outputs 65 and 66 trigger power transistors 69, 70 after the current passes through amplifiers 67, 68. This current then energizes solenoids 39A and 40A corresponding to solenoids 39 and 40 in FIG. 1.

The computer operates by sampling the position of the three input ports 61A, 62A and 63A. If the value of 63A is small, the computer simply enters time delay loop and continues in that mode until 63A reaches a sufficiently high arbitrary value. This value is directly proportional to the swing of pendulum 49. Thus, in small swings, the computer causes the system to remain inactive. Once the value of 63A is high enough, the computer simply senses the values of 61A and 62A and sends a current through amplifier 67 or 68 depending upon which solenoid is to be activated.

In order to employ the present invention to insure that the vehicle maintains a horizontal position during an intense breaking action, it is only necessary to arrange the disclosed pendulum system so that it is sensitive to the position of the vehicle in the direction of forward motion. The front two shock absorbing means would then be activated as disclosed herein in order to counter the effects of breaking. Another alternative would be to feed a signal from the breaking system directly to the computer input.

Referring now to FIGS. 5 and 6, the present invention is shown in its preferred embodiment. In this embodiment, the two shock absorbing members are arranged in one concentric body containing two cylinders threaded together. In this embodiment, second spring means 16 is arranged in parallel with second shock absorbing means 30 and in series with shock absorbing means 3 and first spring means 14. Hydraulic fluid used to raise piston 17 within chamber 20 is pumped through orifice 25 via piping 29. Fluid enters and exists chamber 20 by way of one pipe 29, the hydraulic pumping system not being shown.

Turning now to FIG. 6 which is an enlarged view of the upper portion of the lower shock absorbing means, the solenoid system and further embodiments can be appreciated. Solenoid valve 8 is threaded into the upper disc-like part of lower shock absorber 3. This upper support disc also forms one wall of oil reservoir 71. It was found that when piston 5 was compressed within shock absorbing means 3, piston shaft 13 would occupy significant space within lower chamber 21 thus displacing hydraulic fluid. The hydraulic fluid would be caused to enter reservoir 71 when the shock absorber is compressed. Orifice valves 72 and 73 which are simple ball valves which are spring biased allow for hydraulic fluid to enter reservoir 71 during compression and reflux from reservoir 71 during expansion of shock absorber means 3 thus preventing vacuum build-up behind piston 5.

Means for activating upper or lower shock absorbers have been illustrated only as a mode of practicing the present invention. The invention does not lie in the activation means, but it instead lies in the entire concept of the activation of several shock absorbing means to improve the overall shock absorbing function of a suspension system. Virtually any technique for activating the various solenoids to control fluid flow can be used which sense the relative movement between the sprung mass and contraction or expansion of the lower shock absorber means.

Preferred embodiments of this invention having been described and illustrated in detail, it is to be understood that this has been done by way of illustration only.

What is claimed is:

1. A suspension system for a vehicle having a wheel and a movable support for said wheel comprising:
   A. a first shock absorbing member functionally connected to said wheel support and having upper and lower fluid containing chambers separated by a piston and possessing control means capable of partially restricting flow between said fluid chambers;
   B. a first spring means arranged in parallel with said first shock absorbing member and also functionally connected to said wheel support;
   C. a second shock absorbing member functionally connected to said vehicle frame and arranged in series with said first shock absorbing member and said first spring means; and
   D. a second spring means arranged in parallel with said second shock absorbing member.

2. The suspension system of claim 1 wherein the first spring means has a greater spring stiffness than that of the second spring means.

3. The suspension system of claim 2 wherein the second spring means possesses a spring stiffness approximately 20% of the spring stiffness of the first spring means.

4. The suspension system of claim 1 wherein whenever the first shock absorbing member and first spring means are expanding said control means is caused to partially restrict the fluid flow between said chambers whenever the vehicle frame is vertically rising and said control means is caused to connect the fluid chambers whenever the vehicle frame is vertically falling.

5. The suspension system of claim 1 wherein whenever the first shock absorbing member and first spring means are being compressed said control means is caused to partially restrict the fluid flow between said chambers whenever the vehicle frame is vertically falling and said control means is caused to connect the fluid chamber whenever the vehicle frame is vertically rising.

6. The suspension system of claim 1 wherein said first and second shock absorbing members are arranged concentrically about a single axis.

7. The suspension system of claim 6 wherein an oil reservoir is located between said first and second shock absorbing members.

8. The suspension system of claim 7 wherein said oil reservoir is valved to the upper chamber of said first shock absorbing member wherein hydraulic fluid is allowed to pass within said reservoir during compression of said first shock absorbing member and is valved to allow escape of hydraulic fluid during expansion of said first shock absorbing member.

9. The suspension system of claim 1 wherein said second shock absorbing member is further defined as having a high pressure energy source functionally connected to upper and lower fluid chambers within said second shock absorbing member.

10. The suspension system of claim 9 wherein control means are functionally associated with said high pressure energy source such that whenever the vehicle is on a hill, high pressure energy causes expansion of those second shock absorbing members which make up a part of the suspension system on the downhill wheels.

11. The suspension system of claim 9 wherein control means are functionally associated with said high pressure energy source such that whenever the vehicle is going around a horizontal corner, high pressure energy causes expansion of those second shock absorber members which make up a part of the suspension system on the outermost wheels.

12. The suspension system of claim 1 wherein said second spring means is arranged in parallel with said first shock absorbing member and first spring means and is functionally connected to both the vehicle frame and wheel support.

13. The suspension system of claim 1 wherein said second spring means is arranged in series with said first spring means and first shock absorbing member.

* * * * *